US008595793B2

(12) United States Patent
Kashyap et al.

(10) Patent No.: US 8,595,793 B2
(45) Date of Patent: Nov. 26, 2013

(54) SYSTEM AND METHOD FOR USER LOGIN TO A MULTIMEDIA SYSTEM USING A REMOTE CONTROL

(75) Inventors: Praveen Kashyap, Irvine, CA (US); Toshiro Ozawa, San Diego, CA (US); Dang Van Tran, Laguna Niguel, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 848 days.

(21) Appl. No.: 12/371,365

(22) Filed: Feb. 13, 2009

(65) Prior Publication Data
US 2010/0212001 A1    Aug. 19, 2010

(51) Int. Cl.
    *G06F 21/00*    (2013.01)
(52) U.S. Cl.
    USPC ............... 726/3; 726/4; 726/5; 726/6; 726/7; 725/27; 725/28; 725/29; 725/30; 725/131
(58) Field of Classification Search
    USPC ............... 726/3–7; 345/744; 725/27–30, 131
    See application file for complete search history.

(56) References Cited

U.S. PATENT DOCUMENTS

| | | | |
|---|---|---|---|
| 7,043,530 B2 | 5/2006 | Isaacs et al. | |
| 7,131,132 B1* | 10/2006 | Gehlot et al. | 725/10 |
| 7,640,341 B2 | 12/2009 | Regan | |
| 7,895,076 B2 | 2/2011 | Kutaragi et al. | |
| 8,079,042 B2 | 12/2011 | Foti et al. | |
| 8,185,949 B2* | 5/2012 | Jonsson | 726/18 |
| 2002/0023132 A1 | 2/2002 | Tornabene et al. | |
| 2002/0034281 A1 | 3/2002 | Isaacs et al. | |
| 2003/0151621 A1 | 8/2003 | McEvilly et al. | |
| 2005/0160458 A1 | 7/2005 | Baumgartner | |
| 2006/0143717 A1* | 6/2006 | Ransome et al. | 726/35 |
| 2007/0183746 A1* | 8/2007 | Haeuser et al. | 386/94 |
| 2008/0249987 A1 | 10/2008 | Ogasawara | |

(Continued)

FOREIGN PATENT DOCUMENTS

EP    1489800 A1    12/2004

OTHER PUBLICATIONS

Website printout: www.nielsenmedia.com "Our Measurement Techniques | Nielsen Media Research" in two (2) pages, printed on Apr. 14, 2009.

(Continued)

*Primary Examiner* — Jeffrey Pwu
*Assistant Examiner* — Hee Song
(74) *Attorney, Agent, or Firm* — Kenneth L. Sherman, Esq.; Michael Zarrabian, Esq.; Sherman & Zarrabian LLP (57) ABSTRACT

Embodiments include systems and methods for user login to a multimedia system. In one embodiment, a method of logging in one or more user profiles on a multimedia system includes associating one or more actuation sequences of one or more buttons on a remote control device each with a user profile, each user profile having one or more characteristics for outputting multimedia content, the characteristics affecting multimedia content provided by a multimedia system to personalize the user's multimedia experience, communicating a first signal corresponding to one of the one or more actuation sequences from the remote control device to a multimedia system to identify a first user profile for login, logging in the first user profile as an active user profile on the multimedia system based on the first signal, and controlling multimedia content provided to an output system of the multimedia system based on the active user profile.

28 Claims, 9 Drawing Sheets

(56) References Cited

U.S. PATENT DOCUMENTS

| | | | |
|---|---|---|---|
| 2008/0275974 A1 | 11/2008 | Rackiewicz | |
| 2008/0288996 A1 | 11/2008 | Walter et al. | |
| 2009/0138805 A1 | 5/2009 | Hildreth | |
| 2009/0217356 A1 | 8/2009 | Scott et al. | |
| 2009/0234876 A1* | 9/2009 | Schigel et al. | 707/102 |
| 2009/0248602 A1* | 10/2009 | Frazier | 706/46 |
| 2009/0300671 A1 | 12/2009 | Scott et al. | |
| 2010/0211884 A1 | 8/2010 | Kashyap et al. | |
| 2011/0167355 A1 | 7/2011 | Shelansky et al. | |

OTHER PUBLICATIONS

Website printout: www.nielsenmedia.com "Installing and Monitoring Meters | Nielsen Media Research" in one (1) page, printed on Apr. 14, 2009.

Website printout: www.nielsenmedia.com "Metering Television in the Digital Age | Nielsen Media Research" in one (1) page, printed on Apr. 14, 2009.

Website printout: www.nielsenmedia.com "New Challenges & Ideas | Nielsen Media Research" in one (1) page, printed on Apr. 14, 2009.

U.S. Office Action mailed Apr. 21, 2011, from U.S. Appl. No. 12/371,444.

U.S. Final Office Action for U.S. Appl. No. 12/371,444 mailed Aug. 16, 2011.

U.S. Advisory Action for U.S. Appl. No. 12/371,444 mailed Oct. 20, 2011.

U.S. Non-Final Office Action for U.S. Appl. No. 12/371,444 mailed Nov. 29, 2011.

U.S. Final Office Action for U.S. Appl. No. 12/371,444 mailed Mar. 28, 2012.

U.S. Advisory Action for U.S. Appl. No. 12/371,444 mailed Jul. 11, 2012.

U.S. Advisory Action for U.S. Appl. No. 12/371,444 mailed Aug. 14, 2012.

U.S. Non-Final Office Action for U.S. Appl. No. 12/885,214 mailed Jul. 9, 2012.

U.S. Final Office Action for U.S. Appl. No. 12/885,214 mailed Jan. 2, 2013.

\* cited by examiner

| USER | BUTTON COMBINATION | BINARY NOTATION |
|---|---|---|
| 1 | R | 0001 |
| 2 | G | 0010 |
| 3 | Y | 0100 |
| 4 | B | 1000 |
| 5 | GR | 0011 |
| 6 | YR | 0101 |
| 7 | YG | 0110 |
| 8 | YGR | 0111 |
| 9 | BR | 1001 |
| 10 | BG | 1010 |
| 11 | BGR | 1011 |
| 12 | BY | 1100 |
| 13 | BYR | 1101 |
| 14 | BYG | 1110 |
| 15 | BYGR | 1111 |

SYSTEM AND METHOD FOR USER LOGIN TO A MULTIMEDIA SYSTEM USING A REMOTE CONTROL

BACKGROUND OF THE INVENTION

1. Field of the Invention

This application relates to control and interaction with televisions and other media playback devices.

2. Description of the Related Technology

Identifying a particular viewer (or user) of a computing or multimedia playback device can be useful for controlling information presented to the user and personalizing the viewer's multimedia experience. Control systems that identify a user typically require the user to perform a rather tedious identification process, for example, navigating through a series of menus, or enter identification information such as a password, PIN, or other personal information that identify the particular user (e.g., by a username) and verify the user's authenticity (e.g., by entering a password). Identifying the user, or viewer, facilitates presenting a personalized screen to the user with characteristics associated with the user. For example, a user can select preferred screen preferences, such as a display background image, a screen saver, or which application and shortcut icons are presented on a display. For many applications, such as business computer accounts, banking or online transactions, login security controls can be advantageous to protect against unauthorized access to a user's information. However, current control systems may require tedious login sequences even when security is not a priority for the application. Accordingly, a need exists for improved login methods and devices.

SUMMARY OF CERTAIN INVENTIVE ASPECTS

The system, method, and devices of the invention each have several aspects, no single one of which is solely responsible for its desirable attributes. Without limiting the scope of this invention as expressed by the claims which follow, its more prominent features will now be discussed. After considering this discussion, and particularly after reading the section entitled "Detailed Description of Certain Embodiments" one will understand how the features of this invention provide advantages that include allowing one or more viewers to quickly and easily login to multimedia systems.

One embodiment includes a method of logging in one or more user profiles on a multimedia system, the method comprising associating one or more actuation sequences of one or more buttons on a remote control device each with a user profile, each user profile having one or more characteristics for outputting multimedia content, the characteristics affecting multimedia content provided by a multimedia system to personalize the user's multimedia experience, communicating a first signal corresponding to one of the one or more actuation sequences from the remote control device to a multimedia system to identify a first user profile for login, logging in the first user profile as an active user profile on the multimedia system based on the first signal, and controlling multimedia content provided to an output system of the multimedia system based on the active user profile. Characteristics associated with a user profile relate to one or more of a favorite channel, a favorite genre, a personal bookmark, instant messaging, a rating limit, picture configuration, sound configuration, and screen design. In some embodiments, each of the one or more actuation sequences comprises an ordered sequence of actuating the one or more buttons. In some embodiments, one or more actuation sequences comprises a combination of one or more buttons actuated simultaneously. The method can further comprise communicating the first signal a second time from the remote control device to the multimedia system while the first user profile is logged in; and logging out the first user profile from the multimedia system based on receiving the first signal a second time.

In such methods, associating one or more actuation sequences each with a user profiles can include associating a first button on the remote control with a first user profile and associating a second button on the remote control with a second user profile. The first button may comprise a first color and the second button may comprise a second color, such that the first button and the second button are distinguishable based on their color. The remote control can have a plurality of buttons, distinguishable by shape, color, and/or by the position of the button on the remote control. Associating one or more actuation sequences of one or more buttons on a remote control device each with a user profile can include associating a first button actuation on the remote control device with a first user profile, associating a second button actuation on the remote control device with a second user profile, associating a third button actuation on the remote control device with a third user profile, and associating a fourth button actuation on the remote control device with a fourth user profile. For example, the first, second, third, and fourth buttons may each comprise red, green, yellow, or blue coloring. Associating one or more actuation sequences of one or more buttons on a remote control device with one or more user profiles may comprise associating a different one button or two button actuation sequences of the one or more buttons on the remote control with, for example, one of four different user profiles, or with one of up to sixteen (or more) different user profiles.

Another embodiment includes a multimedia system comprising an output system, a remote control device comprising one or more buttons, the remote control device configured to provide a signal corresponding to a selection of one or more actuation sequences of the one or more buttons, a memory component configured to store one or more user profiles, to store associations of the one or more actuation sequences of the one or more buttons of the remote control with the one or more user profiles, and to store one or more characteristics for outputting multimedia content associated with each of the one or more user profiles, a multimedia processor configured to login one or more user profiles based on the signal received from the remote control, configured to form a joint user profile from two or more logged in user profiles, configured to use a logged in user profile or if it exists the joint user profile as the active user profile, and the processor further configured to control at least some of the multimedia content provided to the output system based on the active user profile.

Another embodiment includes a method of login to a user profile having one or more characteristics for outputting multimedia content, the characteristics affecting multimedia content provided by a multimedia system to personalize a user's multimedia experience, the method comprising selecting a first user profile for login as an active user profile by performing a button actuation sequence on a remote control device, the button actuation sequence comprising actuating one or more buttons on the remote control device in a sequence associated with the first user profile, providing a signal corresponding to the first user profile for login to the multimedia system, logging in the first user profile as the active user profile, and providing multimedia content to an output system of the multimedia system, wherein at least some of the multimedia content provided to the output system is controlled by the active user profile.

Another embodiment includes a computer-program product for selecting a user profile on a multimedia system, the product comprising a computer-readable medium having stored thereon codes executable by at least one processor to associate one or more buttons on a remote control device with one or more user profiles, each user profile having one or more characteristics for outputting multimedia content, the characteristics affecting multimedia content provided by a multimedia system to personalize a user's multimedia experience, apply one or more of the user profiles as an active user profile based on a signal from an input device, and provide multimedia content to an output system of the multimedia system, at least some of the multimedia content provided to the output system being controlled by the active user profile.

Another embodiment includes a system for controlling selection and application of a user profile, comprising means for associating one or more actuation sequences of one or more buttons on a remote control device each with a user profile, each user profile having one or more characteristics for outputting multimedia content, the characteristics affecting multimedia content provided by a multimedia system to personalize the user's multimedia experience, means for communicating a signal corresponding to one of the one or more actuation sequences from the remote control device to a multimedia system to identify a first user profile for login, means for logging in the first user profile as an active user profile on the multimedia system based on the signal, and means for controlling multimedia content provided to an output system of the multimedia system based on the active user profile.

DETAILED DESCRIPTION OF CERTAIN EMBODIMENTS

The following detailed description is directed to certain specific embodiments of the invention. However, the invention can be embodied in a multitude of different ways as defined and covered by the claims. In this description, reference is made to the drawings wherein like parts are designated with like numerals throughout.

As noted above, current login control systems may implement login processes that require a user to enter usernames and passwords to login to a personal computer or other multimedia system (e.g., a television). Such login processes are often tedious and unnecessarily complex, and do not address the particular needs of the system. Fast and simple logins are desired for a multimedia system in which one or more viewers may want to login and logout numerous times during the day as they move into and out of the proximity of the multimedia system. In addition, multiple users often view multimedia content (also referred to herein simply as "content") on a multimedia system simultaneously. The user or group of users viewing the content may change often. Tailoring content to be desired and appropriate for a single user, or a group of users (or viewers), can make the multimedia experience more enjoyable. For example, a parent may want to block certain content from a child while the child is watching television alone, but also may want to self-regulate the content while watching television with the child.

One embodiment of the invention includes a method of logging in one or more users on a multimedia system that allows a user to login (or logout) by actuating a single button on an input device, or by actuating a short sequence of one or more buttons on the input device. In one embodiment, the input device is a remote control device having a plurality of buttons. In one embodiment, the multimedia system includes one or more televisions. As used herein, logging in a user relates to identifying a particular user profile on a multimedia system that the system can apply to provided multimedia content presented to the user. A user profile can include one or more characteristics, each having attributes that are either selected or entered by a user. The characteristics can be used by software and/or hardware in the multimedia system to control multimedia content output by the multimedia system, thereby personalizing a user's multimedia experience. The system stores the user profile in a database or another type of data structure. Some of the characteristics may describe a particular user, for example, indicating age or gender. Other characteristics may relate to a user's preferences for experiencing multimedia content, for example, setting initial or maximum sound levels, graphics, and picture settings.

In some embodiments, the multimedia system includes an output system, a remote control device, a memory component configured to store one or more user profiles, and a multimedia processor configured to login one or more profiles bases on the signal received from the remote control device. The processor is further configured to form a joint user profile from two or more logged in profiles and use the joint profile as the active login. The output system can include an image display device (for example, a display comprising plasma, LCD, LED, CRT, or OLED technology) and/or an audio component (for example, a speaker).

To identify a particular user profile to login to the multimedia system, one or more button actuation sequences on an input device can be associated with a user profile such that when a signal is received indicating a particular actuation sequence has been performed (indicating the particular user is present), the multimedia system applies the associated user profile. In some embodiments, a single button (for example, a red, green, blue or yellow button on the input device) can be associated with a particular user profile. In such cases, the user only has to actuate one button to select a user profile for login. In other embodiments, a sequence of buttons actuations (for example, red/blue, red/yellow, or blue/red) can be associated with a particular user profile. In such cases, a user may actuate the desired sequence of buttons in a certain order to login. In other embodiments, a combination of simultaneous buttons actuations (for example, red/blue, red/yellow, or blue/red) can each be associated with a particular user profile. In such cases, a user may actuate the desired sequence of buttons in a certain order to login. A signal corresponding to an actuation sequence is communicated from the input device to the multimedia system, the signal indicating a first user profile for login. The first user profile is logged into the multimedia system so that multimedia system recognizes the logged in user profile as an active user profile. Multimedia content provided to an output system of the multimedia system is then based on the active user profile. In some embodiments, a plurality of different one and two button sequences are each associated with a user profile. The one and two-button actuation sequences can utilize four buttons on a remote control device.

As used herein, the terms "viewer" and "user" (used synonymously herein) are broad terms that refer to a person who views and/or uses multimedia content, and includes one who accesses multimedia content including one who views audio-video content, views video-only content, plays or accesses audio-only content, interacts with or plays a video game or other interactive program, or views or accesses any other multimedia content. "Multimedia content" (also referred to herein as "content") is a broad term and refers to audio, video, still images, or any other type of visual or audio information. For example, multimedia content may include television or other video broadcast content, video or audio on-demand or downloaded content, or content from the Internet or another network.

Figure 1:
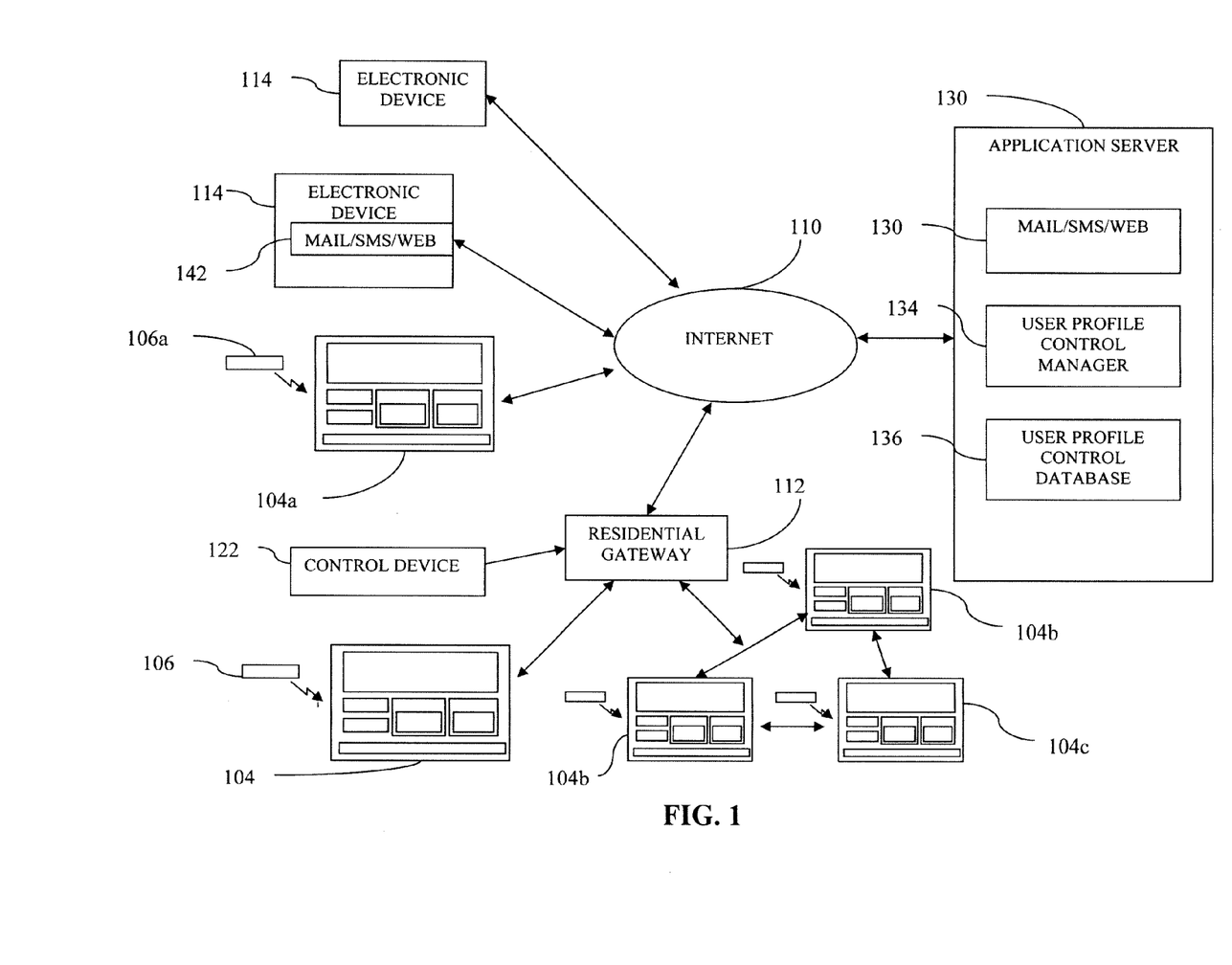
FIG. 1 is a block diagram illustrating components of one embodiment of a system for controlling usage of a television or other media access device.

FIG. 1 is a block diagram illustrating components of one embodiment of a multimedia system 100 for providing multimedia content. Embodiments of system 100 are configured to quickly and easily log in one or more users, and control multimedia content provided to the logged in users based on the users profiles. In one embodiment, a user logs in to a media access device 104 by actuating a sequence of one or more buttons on an input device. In some embodiments, each sequence of one or more buttons can include actuation of one or more separate buttons; in other words, any particular button can only be actuated, at the most, once during an actuation sequence. In some embodiments, each sequence of one or more buttons can include actuating button in a particular sequence. For example, in such embodiments a red/blue button sequence logs in a different user than a blue/red button sequence. The buttons used to facilitate a user login can be disposed directly on the media access device 104, or on a component of the media access device 104. In some embodiments a voice activation system is incorporated in the media access device 104 or another component of the system 100, and a user logs into the system using voice control commands (for example, a person's name). In some embodiments, the one or more buttons are disposed on a remote input device (e.g., a remote control device or "remote control") 106 that is in communication with the media access device 104. The remote control 106 is configured to send a signal associated with an actuation sequence of one or more buttons to indicate which user is logging in.

Still referring to FIG. 1, in various embodiments, components of the system 100 can apply characteristics of one or more user profiles that are logged into the system to control multimedia content presented to the logged in viewer(s). In some embodiments, a first user logs into a media access device 104, thereby selecting a first user profile to be the "active" user profile. The system 100 applies the active user profile to control multimedia content. A second user can log into the media access device 104 while the first user is still logged in. In such cases, the first user profile and the second user profile can be used to form a joint user profile which is applied as the active user profile. The system 100 applies the joint user profile to control multimedia content provided to the logged in users. Similarly, a third user can log into the media access device 104, and/or additional users can log in while one or more other users are previously logged in. The system 100 can form a new joint user profile based on the plurality of logged in users, and uses the new joint profile to control multimedia content provided to the group of logged in users. When a user logs out, and if more than one user is still logged in, the system 100 forms a new joint profile, based on the logged in users, and applies the new joint profile as the active profile. If only one user remains logged in, the system 100 applies the remaining user's profile as the active profile. The joint user profile may be based on one or more characteristics of the logged in user profiles. It is applied as the active user profile that the media access device 104 applies to control multimedia content. Forming and using joint profiles are described herein in further detail in connection with FIG. 9.

In some embodiments, the media access device 104 illustrated in FIG. 1 can be a standalone television that receives user login information and controls the output of multimedia content independently. In such cases, a storage medium for user profile information (e.g., a memory component storing a database or other data structure) and a processor configured to process logins and associated user profiles, and control multimedia content based on the user profiles, may be incorporated on the standalone television 104, as described in connection with FIG. 2. In some embodiments, although operating to control user logins and multimedia content independently, media access device 104 can be optionally connected to and in communication with additional components, for example, a residential gateway 112 and a network 110. As illustrated in FIG. 1, a plurality of media access devices 104b-d maybe in communication with each other and share information, for example, user login or profile information. In other words, each television 104 may provide login control and control multimedia content output based on an active single profile or a joint user profile independently. Alternatively, a number of televisions 104b-d may provide user login/profile control in coordinated fashion with other televisions 104. In some embodiments, an application server 130 can provide configuration and synchronization between several televisions 104, 104a-d.

A illustrated in FIG. 1, the media access device 104 may be in communication with other components of system 100, for example, via one or more routers such as a residential gateway 112, and/or an application server 130, via the Internet 110 or another local area network ("LAN") or a wide are network ("WAN"). The residential network gateway 112 may comprise one or more of an IP router, a cable modem, a DSL modem. The application server 130 can be a separate electronic device that coordinates user login and profile control by the televisions 104 via a network 110. In such embodiments, the application server 130 can include a user profile control database 136 that contains the user profiles. The application server 130 can also include a user profile control manager 134 that is configured to perform one or more of login one or more users, control application of user profiles, determine an active user profile based on a single logged in user, determine a joint user profile to use as the active user profile if more than one user is logged in, and control multimedia content provided to an output of a media access device 104 based on the active user profile. In other embodiments, the application server 130 may be integrated with one or more of the media access devices 104. The application server 130 can be configured to communicate user profile information, including but not limited to the active user profile, to the applicable media access device 104 for a particular user or group of users.

In some embodiments, user login buttons are incorporated in another control device 122 that communicates a signal corresponding to the button actuation sequence of one or more users logging into a media access device 104 through another component of system 100, for example, the residential gateway 112. In such cases, the residential gateway 112 can communicate user login information to a standalone media access device 104 or a group of media access devices 104b-d.

In one embodiment, user profiles may be modified via a user interface provided by the media access device 104. In some embodiments, the application server 130 may provide a configuration user interface, via the television 104, or via another electronic device 114 that is networked with the application server 130. Such electronic devices may include personal computers, PDA's, portable/laptop computers, cell phones, or any other suitable electronic device. In one embodiment, the electronic device may include the application server 130. For example, in one embodiment, the electronic device 114 is a personal computer that also provides the application server 130.

It is to be recognized that while certain embodiments are described in connection with FIG. 1 with reference to an access device 104 comprising a television (e.g., a video monitor, an audio output component, and broadcast television receiver), in other embodiments, the media access device 104 may be embodied as one or more of a video monitor (e.g., without receivers), a cable or satellite set-top boxes, a digital video recorder (DVR), a video disc player (e.g., DVD or other format discs including high definition discs), a mobile telephone handset, or any other multimedia access device. Moreover, a particular system 100 may include any number and type of such media access devices 104.

The application server 130 may be embodied as a server computer or distributed server computing system, as an electronic device such as a personal computer, or within a particular television 104. The application server 130 illustrated in FIG. 1 may include an user profile control manager 134 that provides and maintains usage user login and user profile information via a user profile control database 136. The application server 130 may communicate via the network 110 with one or more televisions 104 to provide user login/profile data. In one embodiment, the application server 130 communicates with the televisions 104 to request synchronization when the application server 130 receives and stores updated user login/profile data. In another embodiment, the televisions 104 request updated data in response to viewer requests for access to content. In one embodiment, the application server 130 does not include the user profile control database 136, but rather the user profile control manager 134 coordinates and maintains the access control data 134 of each television 104. In operation, the user profile control manager 134 can receive new or updated user profile data from media access devices 104 (based on a user's input), and update, or synchronize, a user profile control database 136 resident on one or more media access devices 104.

The application server 130 shown in FIG. 1 may include a user interface module 132 that provides an e-mail, short message system (SMS), or web (e.g., HTML via HTTP) interface for maintaining the access control database 136. The application server 130 may maintain user profile data based on a user login, which in one embodiment is tied to an email, text message, instant message or other identifier. This can be used to facilitate providing emails, text messages, instant messages, or other electronic communications to the logged in user(s) as specified in the user profiles.

The electronic device 114 illustrated in FIG. 1 may include a memory, processor, storage, a display, and one or more user input devices to provided a user interface configured to configure and maintain user login and profile data with the application server 130. In one embodiment, the electronic device 114 includes a web browser, e-mail client, SMS client, or other application 142 that is configured to communicate with the application server 130 to configure access control data. In one embodiment, the electronic device 114 communicates with the application server via the network 110. In another embodiment, the electronic device 114 includes the application server 130. In another embodiment, the electronic device communicates configuration information with the application server 130 which is provided by one of the televisions 104.

Figure 2:
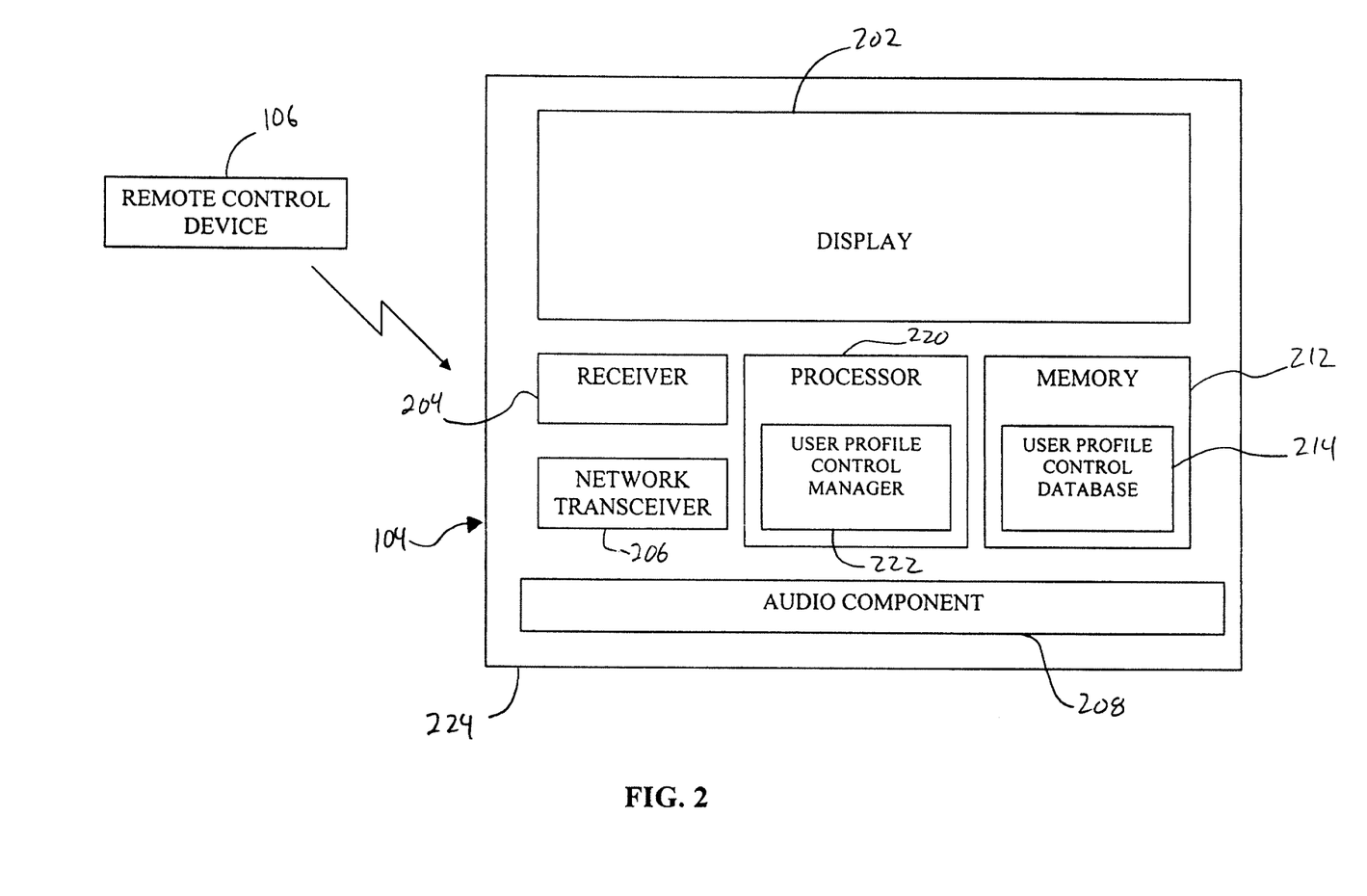
FIG. 2 is a schematic illustrating components of one embodiment of a multimedia system for use in connection with the system of FIG. 1.

FIG. 2 illustrates an example of some components that can be included in media access device (or television) 104. The television 104 includes a display 202 and an audio component 208 in a housing 224. In other embodiments of a media access device 104, but one or both of the display 202 and audio component 208 can be disposed outside of the housing 224. The display 202 can comprise CRT, plasma, LCD, LED, or OLED technology, or another other suitable display technology for presenting visual multimedia content. The audio component 208 can include an output system to provide an audio output signal and/or one or more speakers.

The television 104 illustrated in FIG. 2 also includes a receiver 204 and a network transceiver 206. The receiver 204 refers to a device that can be configured to receive control information from remote control device 106, for example, receive a signal corresponding to one of the one or more button actuation sequences to identify a user profile for login. The receiver 204 can also refer to a device that receives multimedia data. Network transceiver 206 receives multimedia content from a multimedia content provider and can communicate (e.g., send and receive) information with other components of the system 100 (FIG. 1), for example, the application server 130, electronic device 114, and residential gateway 112.

The television 104 shown in FIG. 2 also includes a processor 220 configured with a user profile control manager 222, and a memory component 212 configured with a user profile control database 214, which can operate similarly to the user profile control manager 134 and user profile control database 214 described in FIG. 1. The processor 220 may communicate with the display 202 and the memory 212, the receiver 204, and an input device such as the remote control device 106 or a front panel control. The processor may also communicate with other access devices 104, the application server 106, or electronic devices 114 via the network transceiver 710. The processor 220 may be configured to perform the various functions associated with the television 104. The user profile control database 214 can be any type of data structure that stores information, including a database for example a relational database, lookup tables, linked lists, or other type of data storage structure. The memory component 212 can be any type of electronic memory including RAM memory, flash memory, ROM memory, EPROM memory, EEPROM memory, registers, hard disk, a removable disk, a CD-ROM, or any other form of storage medium known in the art. The memory component 212 is coupled to the processor such the processor can read information from, and write information to, the memory component 212. In some embodiments, the memory component 212 may be integral to the processor 220, or embodied as two memory components, one disposed integral with the processor 220 and the other disposed separate from the processor 220.

In one embodiment, memory component 212 includes an instruction storage medium, having instructions (or data indicative of such instructions where the instructions are stored in compressed or encrypted form) that causes the processor 220 to perform functions associated with the television 104. In addition, or instead of the remote control device 106, the television 104 may implement any other suitable input mechanism including those discussed above with reference to identifying a viewer. The network transceiver 206 may comprise any suitable network interface such as wired or wireless Ethernet and be configured to communicate with the application server 130 via the network 110.

Figure 3:
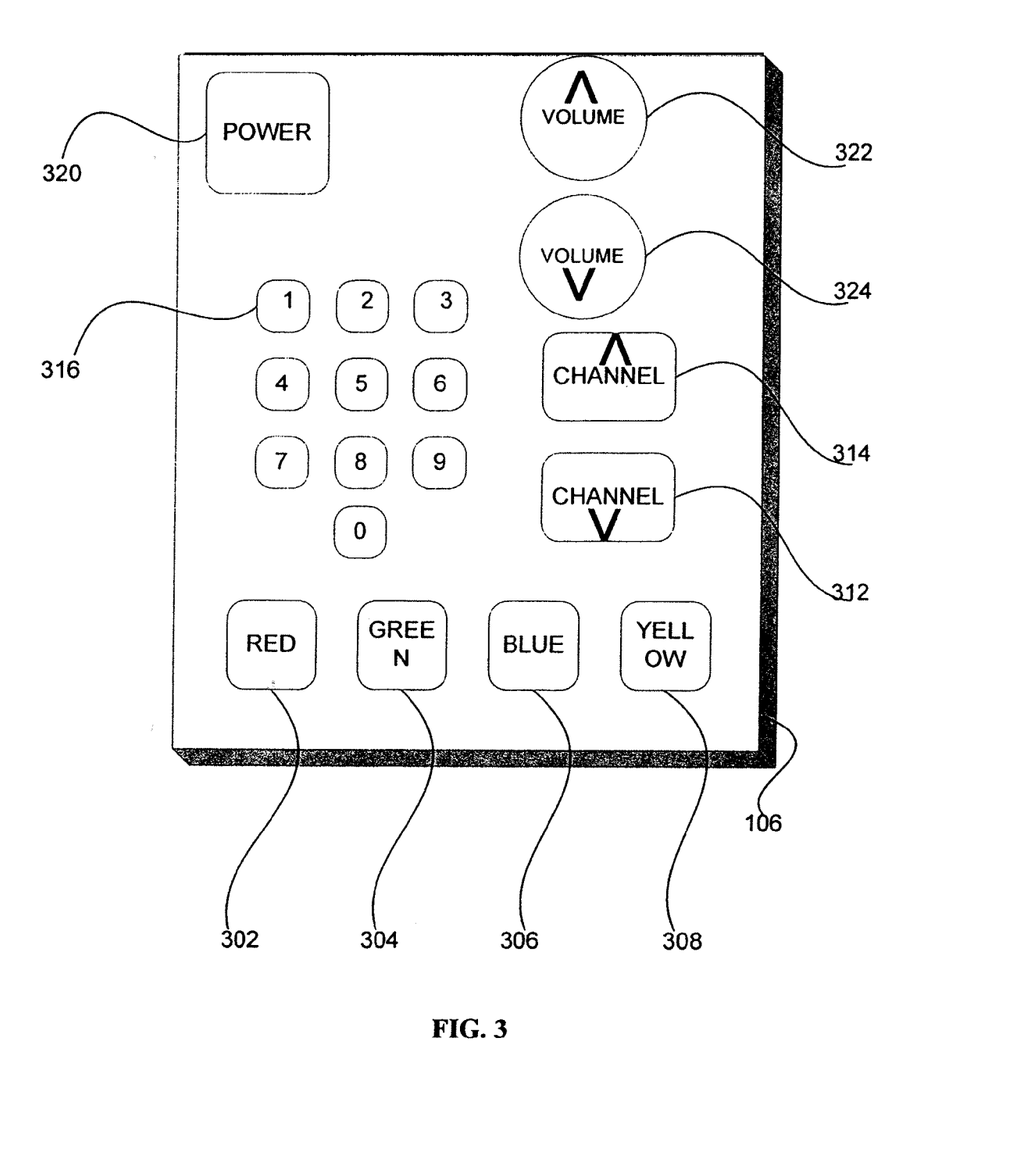
FIG. 3 front view of one embodiment of a control device such as used to control the device illustrated in FIG. 2

FIG. 3 is a front view of one embodiment of a remote control 106 that is configured to provide control signals to the media access device 104. The remote control 106 can include numerous control buttons, for example, power on/off 320, channel selection 312, 314, and volume controls 322, 324. The remote control 106 may also be configured with one or more buttons to identify a user. In some embodiments, the remote control 106 is configured to generate and communicate a login signal upon the actuation of one color button (for example, red button 302, green button 304, blue button 306, and/or yellow button 308), thus providing a fast and simple one-color/one-button identifier for user login. In some embodiments, the remote control 106 can be configured to generate and communicate a login signal upon actuating multiple color buttons in a predetermined sequence (for example, blue button 306 followed by red button 302), or one of the color buttons more than once (for example, green button 304 twice). Numeric buttons 316 or other buttons (for example alphanumeric buttons (not shown)) may be used to enter a viewer password/identifier. In various embodiments, any of these buttons can be used to input or select user profile characteristics/attributes presented to a user on an interface, such as the interface of a media access device 104 illustrated in FIG. 8.

Still referring to FIG. 3, in one embodiment each color button 302, 304, 306, 308 of the control device 106 can be associated with a user profile such that actuation of a single color button quickly and easily logs in the associated user to the media access device 104. The association between a color button, or an actuation sequence of color buttons, and a user/user profile can be predetermined. For example, a television 104 product can initially associate red button 302 with user 1, green button 304 with user 2, blue button 306 with user 3, and yellow button 308 with user 4. In some embodiments, the association between the color button(s) and the user profile is stored in the user profile control database 136, in either the media access device 104 or the application server 130 (FIG. 1), or both. Once a user is logged in, the user can logout by again actuating the same one or more button sequence used to login.

Figure 4A:
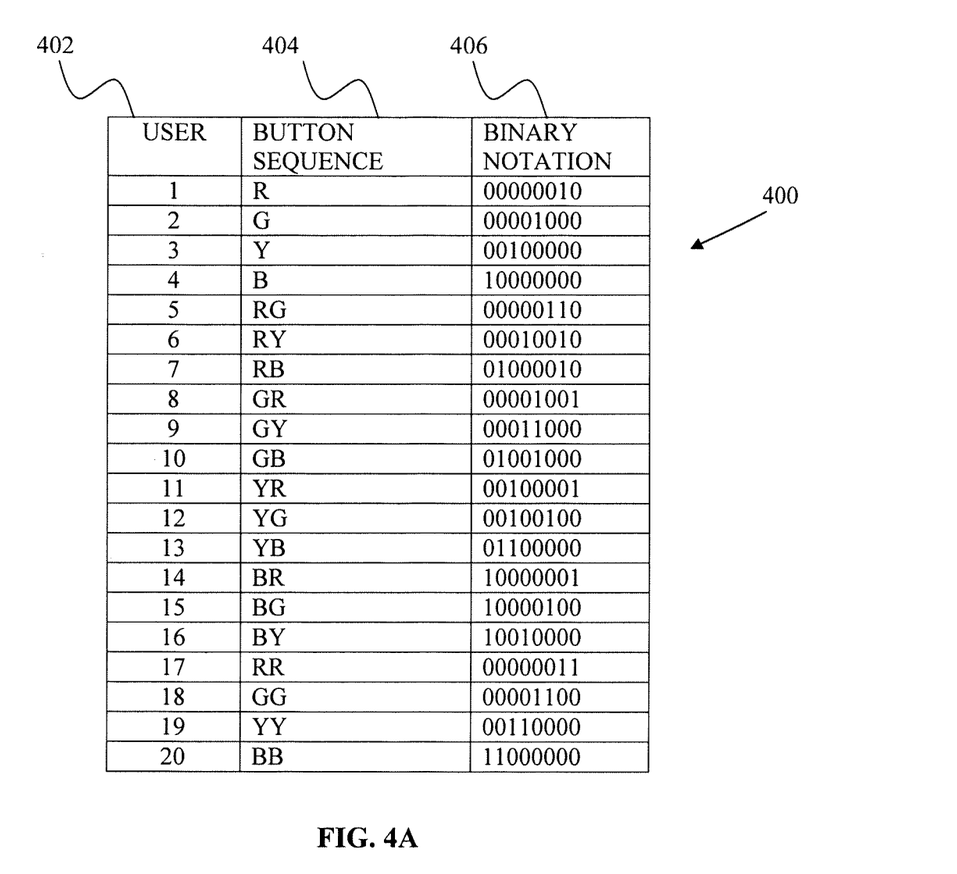
FIGS. 4A and 4B are tables illustrating examples of button sequences for identifying user profiles.
Figure 4B:
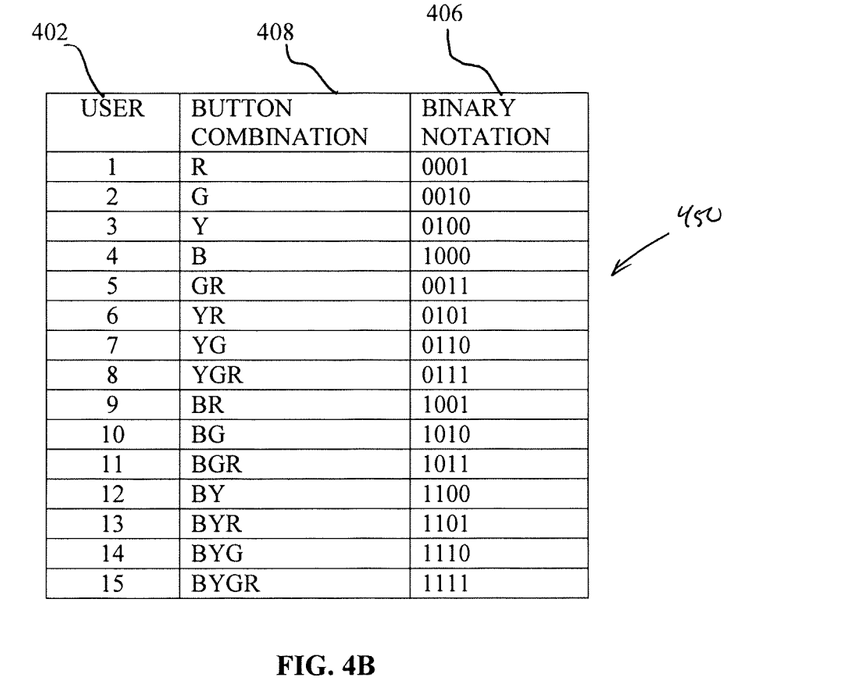

FIGS. 4A and 4B show two tables 400, 450 (respectively) illustrating examples of button sequences (FIG. 4A) and button combinations (FIG. 4B) relating to one or more of four color buttons (e.g., on a remote control) that can be used to login user profiles (or users), according to some embodiments. Referring first to FIG. 4A, table 400 includes a user column 402 listing twenty (20) users. Table 400 also illustrates examples of single button and two-button ordered sequences 404 of a red ("R"), green ("G"), yellow ("Y"), and blue ("B") button. In other words, the buttons are actuated in a particular order. Each button sequence is associated with one of the twenty users 402. A binary notation 406 can be associated with each button sequence and user. The binary notation and can be communicated in a signal from the remote control device 106 to the television 104 to indicate which particular user is logging in. For example, actuating single button "R" corresponds with user 1 and binary notation "0000010." The same two buttons can be used, in a different sequence, to indicate two different users. For example, button sequence "RG" corresponds with user 5 and binary notation "00000110," where button sequence "BG" corresponds with user 15 and binary notation "100000100." In some embodiments, button sequences can include actuating a single button more than one time. For example, button sequence "RR" corresponds with user 17 and binary notation "00000011." The practical implementation of using the same button more than one time in a button actuation sequence (e.g., "RR") can take into account the time between button actuations to distinguish a user login of "RR" from a user logging in by actuating "R" and then quickly logging off by again actuating "R." In this example the binary notation is 8 bits, however, a suitable binary notation can be greater or less than 8 bits, and sized to accommodate a desired number of users. For example, a 4 bit binary notation can be used to support up to sixteen users. In some embodiments, another suitable type of data structure other than the described binary notation can be communicated to indicate a particular user login.

Table 450 in FIG. 4B illustrates various button actuation combinations that can be used to login a plurality of users, according to one embodiment. In table 450, column 402 lists users 1-15. Column 404 lists examples of single buttons, and combinations of the red, green, yellow, and blue buttons that can be actuated and used to login fifteen users that are associated with the listed sequences. In some embodiments, the buttons are actuated in combination simultaneously. In other embodiments, the buttons are actuated in combination but not simultaneously, but also not in a predetermined order, for example, such user 5 could be logged in by actuating buttons "GR" or "RG." In this embodiment, the login button combinations comprise one to four buttons. Column 406 lists examples of binary notations associated with each button combination that can be communicated in a signal from the remote control device 106 to the television 104 to indicate which particular user is logging in. In this embodiment, actuating single button "R" corresponds with the binary notation "0001" and user 1. Button combination "YGR" corresponds with user 8 and binary notation "0111." Button combination "BYGR" corresponds with binary notation "1111" and user 15. In this way, the four color buttons can be used to indicate logins for up to fifteen different users. One of skill in the art will appreciate that an implementation using button combinations for login may be easier, but the user may have difficulty using some combinations depending on the button layout and design.

Figure 5:
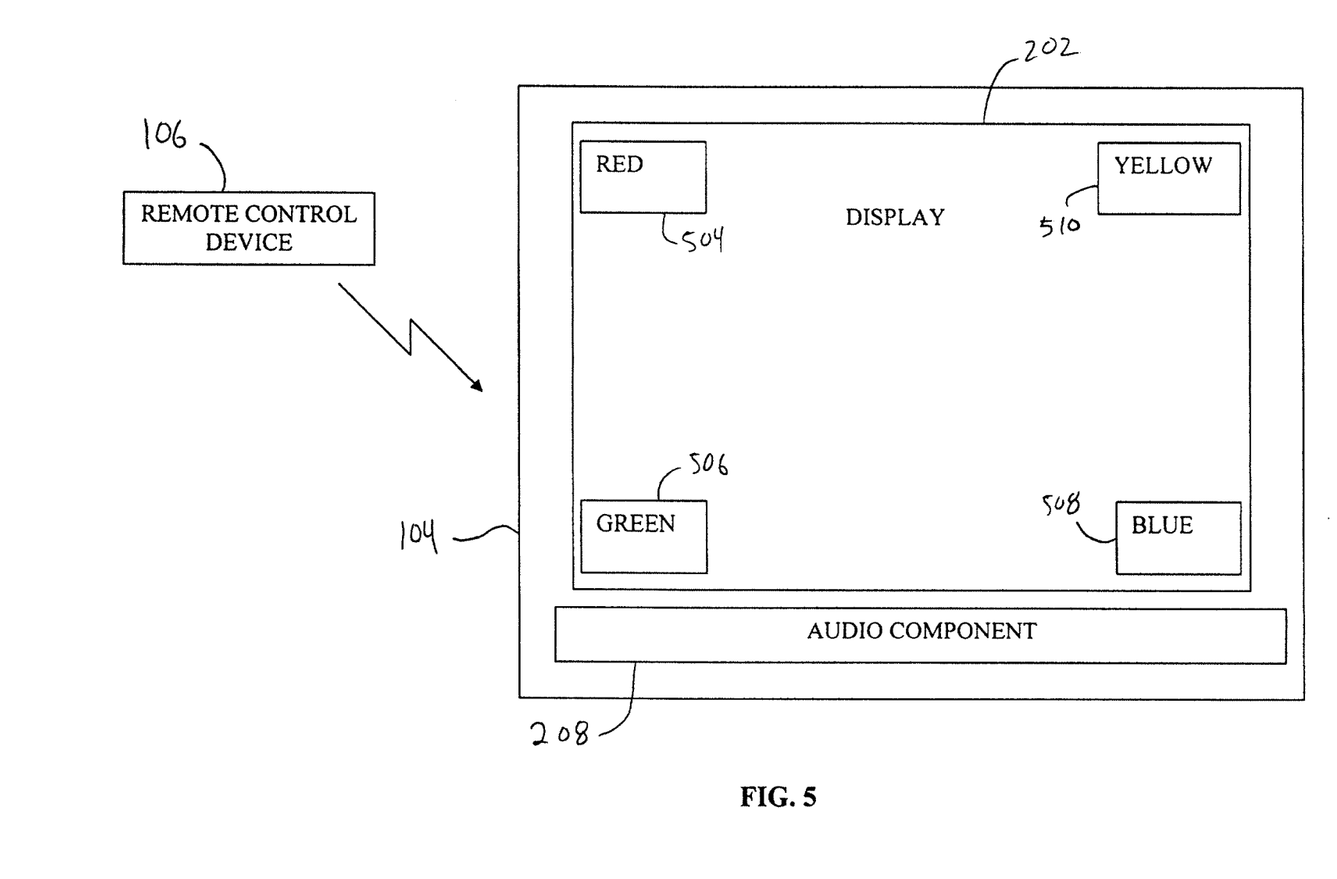
FIG. 5 is a schematic illustrating another embodiment for inputting a user selection indicating a user profile for login to a multimedia system.

FIG. 5 illustrates an embodiment of an interface to login to a media access device 104 (e.g., as shown in FIGS. 1 and 2). In this embodiment, one or more virtual color buttons red 504, green 506, blue 508, and yellow 510 are presented on a display 202 of the media access device 104. The remote control device 106 is configured to select one or more of the virtual buttons by moving an indicator to the desired virtual color button. Button selection is then communicated to the media access device 104, and a user profile control manager 222 determines an active user profile to use to control multimedia content provided to an output system (e.g., the display 202 and/or audio component 208) of the media access device 106.

Figure 6:
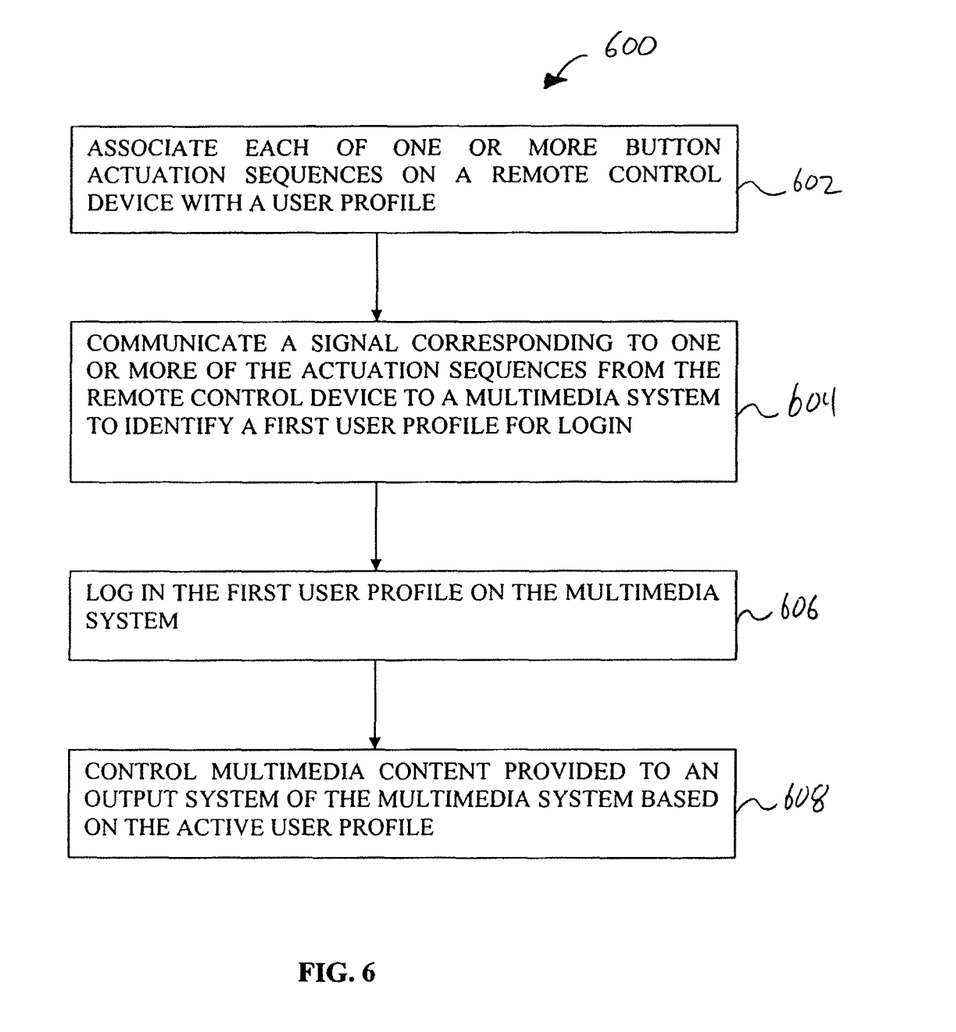
FIG. 6 is a flowchart illustrating one embodiment of a method of logging in to a multimedia system.

FIG. 6 is a flowchart illustrating one embodiment of a method 600 of controlling multimedia content output to a multimedia system, e.g., a television or other media access device 104, based on a user login. The method begins at a block 602 in which an association is formed between a login actuation sequence and a user profile. In some embodiments this includes associating an actuation sequence of one or more buttons on a remote control device 106 with a viewer. In some embodiments, the associations can be stored in a user profile control database 136 accessed by a user profile control manager 134 on a media access device 104 or an application server 130. The actuation sequence can include actuating a single button, actuating multiple buttons, or actuating a button multiple times. In some embodiments, the buttons are color buttons on the remote control device 106.

Next at block 604, a signal corresponding to an actuation sequence is communicated from a remote control device 106 to the multimedia system to identify a first user profile for login. In other words, the television 104 identifies a viewer of the content based on the login signal it receives. In one embodiment, the television 104 includes a remote control with color labels that are assigned to each viewer of the television 104. In embodiments in which the user identifies themselves with a button or a series of buttons, the button or series of buttons may include numeric buttons, pictorial buttons, or buttons associated with any set of remote commands. In response to identifying the viewer, the television 104 may optionally display an icon (e.g., in the color associated with the viewer, or an icon or graphic associated with the viewer) to confirm the selection of the viewer.

Moving to block 606, the method 600 logs in the first user profile on the multimedia system. In one embodiment, this can be performed by a user profile control manager 134 on a media access device 104 or an application server 130 (FIG. 1). The user profile control manager 134 uses the first user login as the active profile. If two or more users log in, the user profile control manager 134 determines an active profile based on the user profiles of the two or more logged in users. Moving to block 608, the method 600 then controls multimedia content provided to an output system of the multimedia system based on the active user profile. The active user profile one or more characteristics are used to control the multimedia content presented to the logged in user. The output system can be one or both of a display 202 and an audio output component 208. Specifically, the multimedia content output is controlled by characteristics of the active user profile, which are further described below in connection with FIG. 7.

Figure 7:
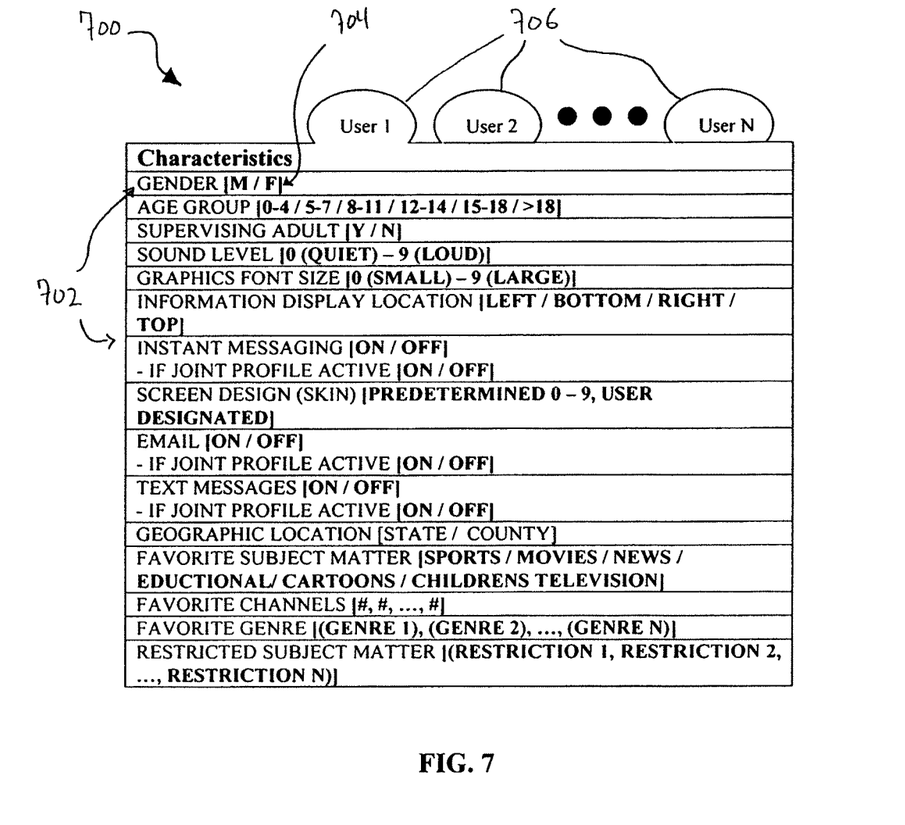
FIG. 7 is a schematic illustrating an example representation of a data structure that can be used to store user profiles, including user profile characteristics and their attributes.

FIG. 7 is a schematic illustrating an example representation of a data structure 700 that can be used to store user profiles 1, 2, . . . , N 706 according to one embodiment. Data structure 700 can be any suitable information storage structure including but not limited to a database (e.g., a relational database), a lookup table, or linked data lists. A user profile includes one or more characteristics 702 (for example but not limited to, gender, age group, supervising adult, sound level, graphics font size, information display location, instant messaging, screen design, email, text messages, geographic location, favorite subject matter, favorite channels, favorite genre, and restricted subject matter, which are discussed further below). FIG. 7 also illustrates attributes 704 (the attributes being illustrated in [brackets]) that are related to each of the characteristics 702. Each characteristic has at least one attribute 704. For example, as illustrated in FIG. 7, the attributes for the characteristic gender is "M" or "F." In some embodiments the user profiles all have the same characteristics. In some embodiments of such cases, the characteristics may initially reflect a default value that can be personalized to a particular user. In other embodiments, a user profile can have one or more of a variety of characteristics, selectable by an authorized user (e.g., an adult owner of the multimedia system), such that the characteristics can be added or deleted from a user profile. In addition, a user profile can be personalized to the associated user by changing one or more attributes of its characteristics. In some embodiments the attributes are selectable from a list. In some embodiments, the attributes may be entered by a user.

In some embodiments, the characteristics of a user profile can include one or more of gender, age group, whether user is a supervising adult, sound level (e.g., initial sound level, or sound level limits), graphics font size, display information location, and screen design. Other characteristics of a user profile can include one or more of whether to enable communications with the logged in user for email, text messages, and instant messages, and whether such communications should be enabled if a joint user profile is the active profile, indicating that two or more users are logged and may be viewing any displayed communications. Other characteristics of a user profile can include one or more of geographic location, favorite subject matter; favorite channels, favorite genre, and restricted subject matter. In some embodiments, the characteristics can be used to independently control multimedia content provided to an output system. In some embodiments, selecting a particular attribute of one characteristic affects the attribute of another characteristic such that some attributes can be automatically selected. For example, if the age group attribute "0-4" is selected, the supervising adult attribute "N" can be automatically selected, e.g., by the user profile control manager 134. In some embodiments, a user can override the automatic attribute selection. While data structure 700 illustrates certain characteristics and attributes according to one embodiment, user profiles can be employed that have additional characteristics and/or attributes, or that do not have some of the listed characteristics and/or attributes.

Figure 8:
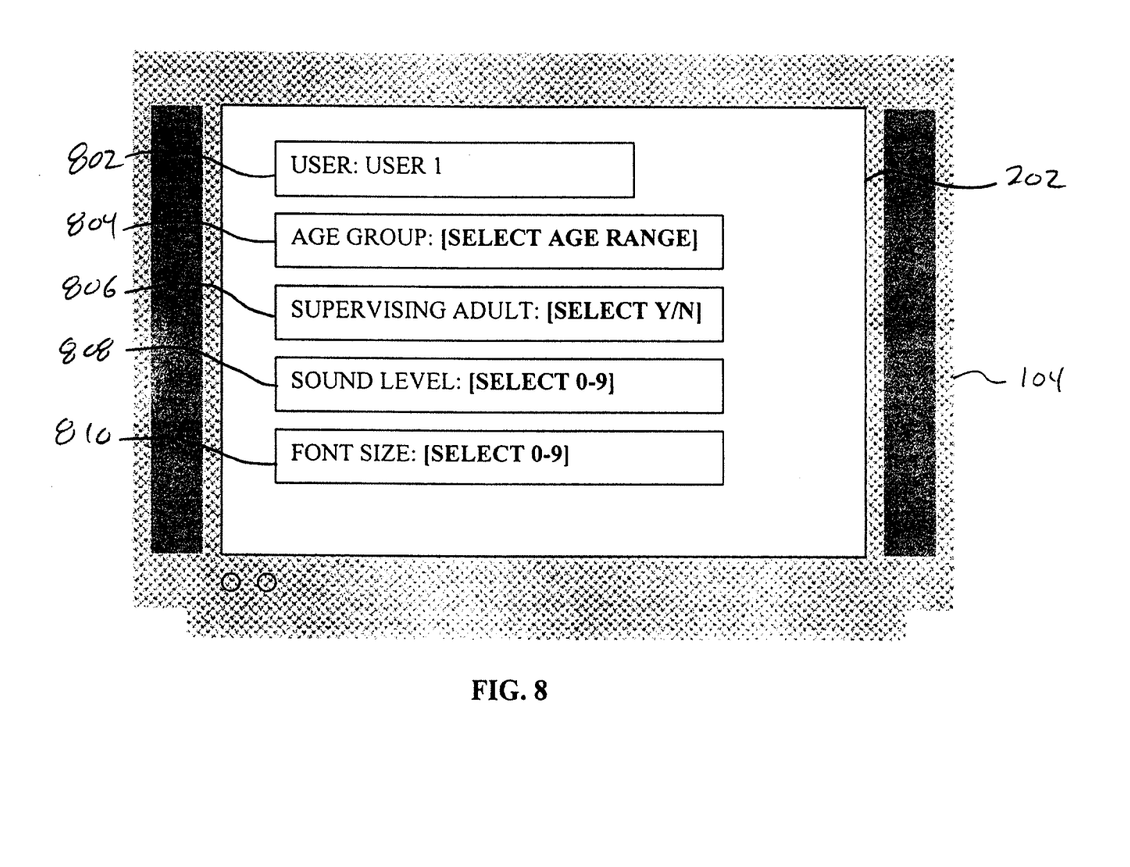
FIG. 8 is a example of a portion of a user interface that can be displayed on a display of a media access device and used for tailoring characteristics of a user profile for a particular user.

FIG. 8 is a example of a portion of a user interface that can be displayed on a display of a television 104 and used for tailoring characteristics of a user profile for a particular user, according to one embodiment. In FIG. 8, five characteristic fields are displayed on the television 104. However, the user interface can be scrolled down to access other characteristic fields. Here, the user interface includes a user identification field 802 that identifies the user profile being tailored (or generated). In this embodiment, the user interface includes an age group field 804 which has a selectable age group range attribute. The user interface includes a supervising adult field 806 with a selectable "Y/N" attribute. The user interface of FIG. 8 also illustrates a sound level field 808 with a selectable sound level range "0-9," and a font size field with a selectable size range "0-9." In one embodiment the television 104 independently provides the user interface. In one embodiment, the television 104 is in communication with the application server 130 which provides the user interface. Alternatively, or in addition, the application server 130 may provide the user interface via an e-mail, SMS, or web interface to the television 104 or other electronic devices 114. In one embodiment, a user must be authenticated before gaining access to the interface for tailoring user profiles, for example, by providing a password to the media access device 104. In one embodiment, data entered for each user profile can be stored in the user profile control database 136, residing on either, or both, of an application server 130 or the media access device 104. As noted above the application server 130 may synchronize the updated data with one or more media access devices 104, or provide ant received updated data when requested by the media access devices 104. In one embodiment, a plurality of media access devices share and/or synchronize user profile information over a wireless or wired network, for example, a LAN, WAN, a Bluetooth network, or the Internet.

It is to be recognized that depending on the embodiment, certain acts or events of any of the methods described herein can be performed in a different sequence, may be added, merged, or left out all together (e.g., not all described acts or events are necessary for the practice of the method). Moreover, in certain embodiments, acts or events may be performed concurrently, e.g., through multi-threaded processing, interrupt processing, or multiple processors, rather than sequentially.

Those of skill will recognize that the various illustrative logical blocks, modules, circuits, and algorithm steps described in connection with the embodiments disclosed herein may be implemented as electronic hardware, computer software executed by on or more processors, or combinations of both. To clearly illustrate this interchangeability of hardware and software, various illustrative components, blocks, modules, circuits, and steps have been described above generally in terms of their functionality. Whether such functionality is implemented as hardware or software executed by a processor depends upon the particular application and design constraints imposed on the overall system. Skilled artisans may implement the described functionality in varying ways for each particular application, but such implementation decisions should not be interpreted as causing a departure from the scope of the present invention. For example, the various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a television or other access device. In the alternative, the processor and the storage medium may reside as discrete components in a television or other access device.

While the above detailed description has shown, described, and pointed out novel features of the invention as applied to various embodiments, it will be understood that various omissions, substitutions, and changes in the form and details of the device or process illustrated may be made by those skilled in the art without departing from the spirit of the invention. As will be recognized, the present invention may be embodied within a form that does not provide all of the features and benefits set forth herein, as some features may be used or practiced separately from others. The scope of the invention is indicated by the appended claims rather than by the foregoing description. All changes which come within the meaning and range of equivalency of the claims are to be embraced within their scope.

What is claimed is:

1. A method of logging in one or more user profiles on a multimedia system, the method comprising:
    associating one or more actuation sequences of one or more buttons on a remote control device each with a user profile, wherein a first actuation on the remote control is associated with a first user profile and a second actuation on the remote control is associated with a second user profile;
    communicating a first signal corresponding to one of the first actuation sequence from the remote control device to a multimedia system to identify the first user profile for login;
    logging in the first user profile as an active user profile on the multimedia system based on the first signal;
    communicating a second signal from the remote control device to the multimedia system to identify the second user profile for login while the first user profile is logged in;
    logging in the second user profile on the multimedia system based on the second signal; and
    controlling multimedia content provided to an output system of the multimedia system based on forming a joint user profile using the logged in first user profile and the logged in second user profile, wherein each user profile comprises a plurality of characteristics that affects multimedia content provided by a multimedia system to personalize the user's multimedia experience.

2. The method of claim 1, wherein at least one of the one or more actuation sequences comprises an ordered sequence of actuating the one or more buttons.

3. The method of claim 1, wherein at least one of the one or more actuation sequences comprises actuating a combination of the one or more buttons.

4. The method of claim 3, wherein the combination of the one or more buttons are actuated simultaneously.

5. The method of claim 1, further comprising: communicating the first signal a second time from the remote control device to the multimedia system while the first user profile is logged in; and logging out the first user profile from the multimedia system based on receiving the first signal a second time.

6. The method of claim 1, wherein the first actuation on the remote control comprises actuating a first button and the second actuation on the remote control comprises actuating a second button.

7. The method of claim 6, wherein the first button comprises a first color button and the second button comprises a second color button such that the first button and the second button are distinguishable based on color.

8. The method of claim 1, wherein associating one or more actuation sequences of one or more buttons on a remote control device each with a user profile comprises:
    associating a first button actuation on the remote control device with a first user profile;
    associating a second button actuation on the remote control device with a second user profile;
    associating a third button actuation on the remote control device with a third user profile; and
    associating a fourth button actuation on the remote control device with a fourth user profile.

9. The method of claim 8, wherein the first, second, third and fourth buttons are colored differently on the remote control device.

10. The method of claim 8, wherein the first, second, third and fourth buttons are each configured in a different shape.

11. The method of claim 9, wherein the first, second, third, and fourth buttons each comprise red, green, yellow, or blue coloring.

12. The method of claim 1, wherein associating one or more actuation sequences of one or more buttons on a remote control device with one or more user profiles comprises associating one button or two button actuation sequences of the one or more buttons on the remote control with up to four different user profiles.

13. The method of claim 1, wherein associating one or more actuation sequences of one or more buttons on a remote control device with one or more user profiles comprises associating one button or two button actuation sequences of the one or more buttons on the remote control with up to sixteen different user profiles.

14. The method of claim 1, wherein the output system comprises a visual output component.

15. The method of claim 14, wherein the visual output component comprises a display.

16. The method of claim 14, wherein the output system further comprises an audio component comprising one or more speakers.

17. The method of claim 1, wherein the multimedia system comprises a television.

18. The method of clam 1, wherein the characteristics associated with a user profile comprise one or more of a favorite channel, a favorite genre, a personal bookmark, instant messaging, a rating limit, picture configuration, sound configuration, and screen design.

19. The method of claim 1, wherein a new joint user profile is formed based a plurality of logged on users and on a change in a number of logged on users.

20. The method of claim 19, wherein a new joint user profile is formed based on a user logging off and more than one users remaining logged on.

21. A method of logging in a user profile having one or more characteristics for outputting multimedia content, the characteristics affecting multimedia content provided by a multimedia system to personalize a user's multimedia experience, the method comprising:
    selecting a first user profile for login as an active user profile by performing a first button actuation sequence on a remote control device, the first button actuation sequence comprising actuating one or more buttons on the remote control device in a first sequence associated with the first user profile, wherein the remote control comprises multiple differently colored buttons for selecting an active user profile;
    providing a first signal corresponding to the first user profile for login to the multimedia system;
    logging in the first user profile as the active user profile;
    selecting a second user profile by performing a second button actuation sequence on the remote control device, the second button actuation sequence comprising actuating one or more buttons in a second sequence on a remote control device in communication with the multimedia system, the second actuation sequence being associated with the second user profile;
    providing a second signal indicating the second user profile for login to the multimedia system;
    processing the second signal indicating the second user login to login to the second user profile;
    forming a joint user profile based on the first user profile and the second user profile;
    providing multimedia content to an output system of the multimedia system, wherein the multimedia content provided to the output system is controlled by the joint user profile, wherein each user profile comprises a plurality of characteristics that affects multimedia content provided by the multimedia system to personalize a user's multimedia experience.

22. The method of claim 21, wherein the one or more characteristics associated with a user profile comprise one or more of favorite channels, favorite genre, personal bookmarks, instant messaging client identify, rating limits, picture configurations, sound configurations, and screen design.

23. The method of 21, wherein the remote control device comprises four differently colored buttons for selecting an active user profile.

24. A computer-program product for selecting a user profile on a multimedia system, the product comprising:
    a non-transitory computer-readable medium having stored thereon codes executable by at least one processor to:
        associate a first button on a remote control device with a first user profile and a second button on the remote control with a second user profile, each user profile having one or more characteristics for outputting multimedia content, the characteristics affecting multimedia content provided by a multimedia system to personalize a user's multimedia experience;
        apply one or more of the user profiles as an active user profile based on a signal from an input device;
        form a joint user profile from at least two user profiles; and
        provide multimedia content to an output system of the multimedia system, at least some of the multimedia content provided to the output system being controlled by the joint user profile.

25. A system for controlling selection and application of a user profile, comprising:
    means for associating one or more actuation sequences of one or more buttons on a remote control device each with a user profile, each user profile having one or more characteristics for outputting multimedia content, the characteristics affecting multimedia content provided by a multimedia system to personalize the user's multimedia experience, wherein the remote control comprises multiple differently colored buttons for selecting an active user profile;
    means for communicating a signal corresponding to one of the one or more actuation sequences from the remote control device to a multimedia system to identify a first user profile for login;
    means for logging in the first user profile as an active user profile on the multimedia system based on the signal;
    means for communicating a second signal from the remote control device to the multimedia system to identify a second selected user profile for login while the first user profile is logged in, the signal corresponding to one of the one or more actuation sequences;
    means for logging in the second desired user profile on the multimedia system based on the second signal;
    means for forming a joint user profile based on logged in user profiles;
    means for controlling multimedia content provided to an output system of the multimedia system based on the joint user profile, wherein each user profile comprises a plurality of characteristics that affects multimedia content provided by a multimedia system to personalize the user's multimedia experience.

26. A method of logging in one or more user profiles on a multimedia system, the method comprising:
   identifying particular user profiles according to at least a single button actuation on a remote control;
   logging in a first user profile as an active user profile on the multimedia system based on a first button actuation;
   logging in the second user profile on the multimedia system based on a second button actuation;
   forming a joint user profile based on the logged in first user profile and second user profile;
   controlling multimedia content provided to an output system of the multimedia system based on the joint user profile, wherein the joint user profile comprises a plurality of characteristics that affects multimedia content provided by a multimedia system to personalize the first user and second user multimedia experience, wherein a new joint user profile is formed based a plurality of logged on users and on a change in a number of logged on users.

27. A method comprising:
   forming a joint user profile based on a logged in first user profile and a logged in second user profile, wherein the first user profile is associated with a first actuation sequence of a remote control, and the second user profile is associated with a second actuation sequence of the remote control;
   controlling multimedia content provided to an output system of the multimedia system based on the joint user profile, wherein the joint user profile comprises a plurality of characteristics that affects multimedia content provided by a multimedia system to personalize multimedia experience,
   wherein a new joint user profile is formed based a plurality of logged on users and on a change in a number of logged on users.

28. A method comprising:
   forming a joint user profile based on a number of logged in user profiles; and
   controlling multimedia content provided to an output system of a multimedia system based on the joint user profile; and
   forming a new joint user profile based on a plurality of logged on users and on a change in a number of logged on users,
   wherein a formed joint user profile comprises a plurality of characteristics that affects multimedia content provided by the multimedia system to personalize multimedia experience,
   wherein each of the number of logged in user profiles is associated with a different actuation sequence of a remote control.

* * * * *